United States Patent
Jouanne et al.

(10) Patent No.: US 10,016,964 B2
(45) Date of Patent: Jul. 10, 2018

(54) METHOD AND DEVICE FOR FITTING INSERTS BY BONDING BY WAY OF CONTROLLED POLYMERIZATION

(71) Applicant: THALES, Neuilly-sur-Seine (FR)

(72) Inventors: Pierre Jouanne, Toulouse (FR); Silvain Legrand, Toulouse (FR); Olivier Damiano, Toulouse (FR)

(73) Assignee: THALES, Courbevoie (FR)

( * ) Notice: Subject to any disclaimer, the term of this patent is extended or adjusted under 35 U.S.C. 154(b) by 559 days.

(21) Appl. No.: 14/521,041

(22) Filed: Oct. 22, 2014

(65) Prior Publication Data

US 2015/0114557 A1    Apr. 30, 2015

(30) Foreign Application Priority Data

Oct. 25, 2013 (FR) ..................................... 13 02473

(51) Int. Cl.
| | |
|---|---|
| *B32B 37/12* | (2006.01) |
| *B32B 38/18* | (2006.01) |
| *B32B 37/14* | (2006.01) |
| *C09J 5/00* | (2006.01) |
| *B32B 38/00* | (2006.01) |

(52) U.S. Cl.
CPC .......... *B32B 37/1284* (2013.01); *B32B 37/14* (2013.01); *B32B 38/18* (2013.01); *C09J 5/00* (2013.01); *B32B 2037/1253* (2013.01); *B32B 2038/0076* (2013.01); *B32B 2305/34* (2013.01); *B32B 2310/0831* (2013.01); *Y10T 156/1798* (2015.01)

(58) Field of Classification Search
CPC ...... B32B 37/1284; B32B 37/14; B32B 38/18
See application file for complete search history.

(56) References Cited

U.S. PATENT DOCUMENTS

| | | | | |
|---|---|---|---|---|
| 5,059,206 A | * | 10/1991 | Winters ............. | A61B 17/0469 606/213 |
| 6,012,888 A | * | 1/2000 | Meyer ................... | F16B 11/006 411/82 |
| 2005/0277867 A1 | | 12/2005 | Minoguchi et al. | |
| 2006/0113031 A1 | * | 6/2006 | Langtry ................. | E21D 20/02 156/293 |

(Continued)

FOREIGN PATENT DOCUMENTS

| | | |
|---|---|---|
| JP | H08-285966 A | 11/1996 |
| WO | 2011049564 A1 | 4/2011 |

*Primary Examiner* — Daniel McNally
(74) *Attorney, Agent, or Firm* — Baker & Hostetler LLP

(57) ABSTRACT

A device and a method intended to fit an insert in an orifice formed in a structure. The device is a fitting vehicle comprising the insert to be fitted, a polymerizable adhesive, and an applicator. The applicator comprises: an open enclosure in which the insert and the adhesive can be held; deployment means that are able to push back the insert and the adhesive out of the open enclosure so as to allow the insert to be fitted in the orifice in the structure. The fitting vehicle is configured to allow the polymerization of the adhesive held in the open enclosure of the applicator to be initiated. Advantageously, the adhesive is microencapsulated in the form of microcapsules of resin and hardener; the step of polymerization of the adhesive being initiated by rupturing of the microcapsules.

8 Claims, 3 Drawing Sheets

(56) References Cited

U.S. PATENT DOCUMENTS

| | | | |
|---|---|---|---|
| 2007/0051718 A1* | 3/2007 | Schmitt | B23P 19/006 219/635 |
| 2008/0154368 A1* | 6/2008 | Justis | A61B 17/7013 623/11.11 |
| 2010/0043966 A1* | 2/2010 | Dunn | B32B 17/10706 156/275.5 |

* cited by examiner

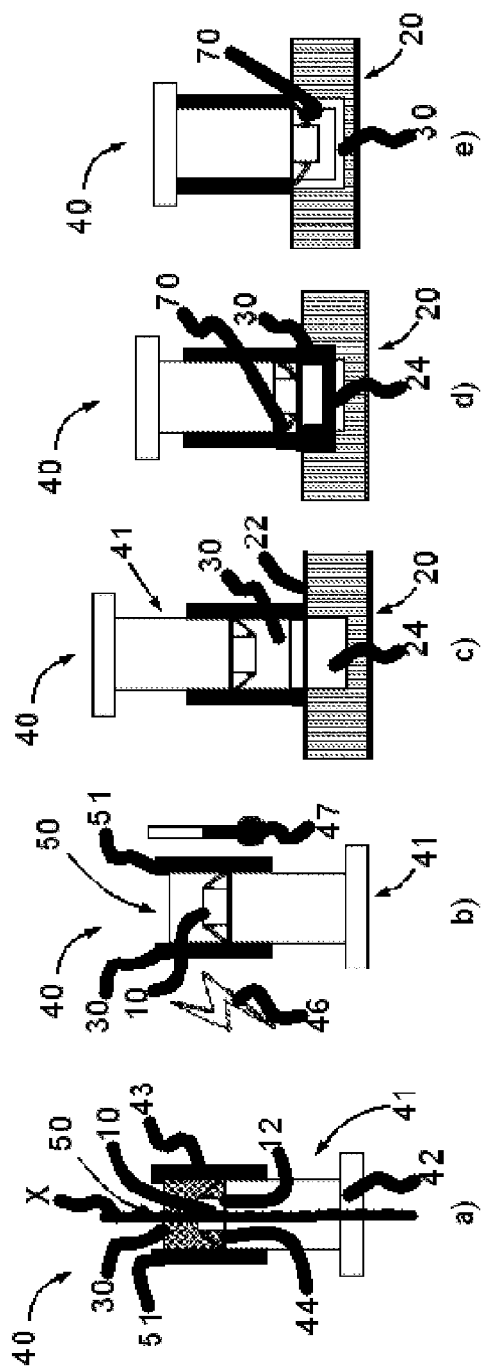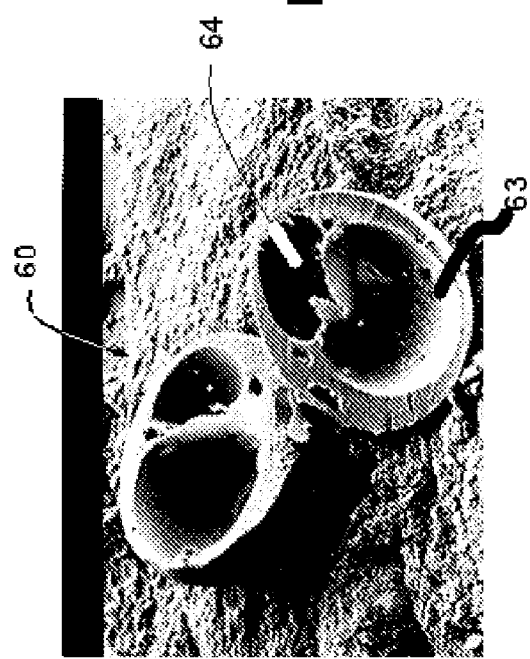

METHOD AND DEVICE FOR FITTING INSERTS BY BONDING BY WAY OF CONTROLLED POLYMERIZATION

CROSS-REFERENCE TO RELATED APPLICATION

This application claims priority to foreign French patent application No. FR 1302473, filed on Oct. 25, 2013, the disclosure of which is incorporated by reference in its entirety.

FIELD OF THE INVENTION

The present invention relates to the field of fitting inserts in a structure, and more particularly relates to a method and a device suitable for fitting inserts by bonding by means of an adhesive the polymerization of which is initiated or accelerated in the fitting vehicle before the insert is fitted in the structure.

BACKGROUND

The fitting of inserts on a structure is a widespread technique for allowing equipment to be fixed to the structure. A common example is the fitting of wall plugs in a wall so as to fix an item of equipment on the wall by way of a screw engaging with the wall plug. In the field of aerospace and aeronautics, inserts are fitted in order to fix equipment to the structural panels of a satellite or aircraft. In particular, structural panels for satellites, commonly known as sandwich panels, made of composite aluminium or carbon materials having a honeycomb structure are known, said panels being employed to produce the supporting structure of the satellite or to carry solar generators. In order to allow the structure to be assembled or the equipment to be fixed, these panels are provided with numerous inserts distributed over the surface of the panel.

According to a first known technique, the insert may pass all the way through. The insert comprises for example a bolt mounted on one side of the panel and a nut on the other side of the panel. A thread formed in the bolt allows an item of equipment to be fixed to the panel. However, this technique has the drawback that the insert has a high mass.

According to a second known technique, it is possible for the insert not to pass all the way through, allowing a significant lightening of the insert. The insert can be fixed by bonding in an orifice formed in the structure. In this example, illustrated in FIGS. 1a and 1b, the insert 10 comprises a substantially cylindrical body 11 and a flange 12. In one known embodiment given by way of example, the body 11 has an outside diameter of 5 to 7 mm and the flange 12 has a diameter of 11 mm. The structure 20 is a panel consisting of an internal honeycomb structure 21 and comprising two external surfaces 22 and 23 generally made of aluminium or carbon. The insert 10 is fitted in an orifice 24 in the panel 20. The orifice 24 is configured such that, when the insert 10 butts against the end of the orifice 24, the external surface of the flange 12 of the insert is flush with the external surface 22 of the panel. The insert generally comprises a thread 13 in the body 11, said thread 13 being substantially coaxial with said body 11, allowing equipment to be fixed to the structure. The insert is secured to the panel by means of an adhesive 30 deposited in the orifice 24. For the purposes of this deposition, the insert comprises two ducts that lead into the flange 12. A first duct 15 allows adhesive to be injected into the orifice 24 and a second duct allows air present in the orifice to be evacuated. The insert is generally fitted manually. The insert is first of all deposited in the orifice. The adhesive previously prepared and placed in a syringe is then injected into the orifice through the duct 15 in the insert.

In the frequent case of a two-component adhesive, the adhesive is stored in two phases, a first phase consisting of a polymerizable resin and a second phase consisting of a hardener for initiating the polymerization of the resin after being brought into contact with the latter. Mixing the two phases is a tricky step. It is necessary to ensure good homogeneity of the mixture while avoiding the creation of air bubbles within the adhesive, said air bubbles being able to create subsequent defects in the mechanical integrity of the insert in the panel. The pot life of the adhesive is limited. The steps of mixing, integrating the adhesive in the syringe and injecting the adhesive into the insert mounted on the panel therefore have to be carried out in a very short time. In addition, the high viscosity of the adhesive complicates the handling and injection of the adhesive. Air bubbles are likely to be created during the deposition of the adhesive in the indentations of the orifice and the insert.

In order to improve production rates, attempts have been made to automate the method of fitting inserts. However, on account of these difficulties of controlling the quality of mixing and deposition, and the limited useful life of the adhesive, these automated methods remain complex and expensive and the production rates remain limited. In practice, fitting inserts remains generally manual, with small quantities of adhesive being prepared at regular intervals.

It is thus desirable to have a method for fitting inserts that makes it possible to do away with the abovementioned difficulties. In order to allow the implementation of effective automated methods, better control of the process of preparing, applying and polymerizing the adhesive is desired.

SUMMARY OF THE INVENTION

To this end, the subject of the invention is a method for fitting an insert by bonding in an orifice formed in a structure, comprising:
  a first step which consists in assembling a fitting vehicle comprising an insert to be fitted, an applicator and a polymerizable adhesive,
  a second step which consists in initiating the polymerization of the adhesive in the fitting vehicle,
  a third step which consists in fitting the insert and the adhesive in the orifice in the structure by triggering the applicator of the fitting vehicle applied to the structure.

Advantageously, the adhesive is a two-component adhesive comprising a resin and a hardener, the bringing of which into contact with the resin initiates the polymerization of the adhesive.

Advantageously, the method comprises a preliminary step of microencapsulating the adhesive, in the form of microcapsules of resin and hardener; the second step of polymerization of the adhesive being initiated by rupturing of the microcapsules, allowing the resin and the hardener to be brought into contact.

Advantageously, the second step of polymerization is initiated by the temperature of the fitting vehicle being raised.

Advantageously, the second step is initiated by the fitting vehicle being exposed to electromagnetic radiation.

Advantageously, the electromagnetic radiation is ultraviolet radiation.

Advantageously, the first step of assembling the fitting vehicle comprises a first substep which consists in fixing the insert in an open enclosure of the applicator; and a second substep which consists in depositing the adhesive in the open enclosure, at least partially covering the insert.

Advantageously, the method comprises one or more automated steps.

The invention also relates to a fitting vehicle intended to fit an insert in an orifice formed in a structure, comprising the insert to be fitted, a polymerizable adhesive, and an applicator; the applicator comprising:
an open enclosure in which the insert and the adhesive can be held;
deployment means that are able to push back the insert and the adhesive out of the open enclosure so as to allow the insert to be fitted in the orifice in the structure;
the fitting vehicle being configured to allow the polymerization of the adhesive held in the open enclosure of the applicator to be initiated.

Advantageously, the adhesive is a two-component adhesive comprising a resin and a hardener, the bringing of which into contact with the resin initiates the polymerization of the adhesive.

Advantageously, the adhesive is microencapsulated in the form of microcapsules of resin and hardener; it being possible for the polymerization of the adhesive to be initiated by rupturing of the microcapsules allowing the resin and the hardener to be brought into contact.

Advantageously, the fitting vehicle can be configured to allow the temperature of the adhesive in the open enclosure of the applicator to be raised, said raising being able to initiate the polymerization of the adhesive.

Advantageously, the fitting vehicle can be configured to allow the adhesive in the open enclosure of the applicator to be exposed to electromagnetic radiation that is able to initiate the polymerization of the adhesive.

Advantageously, the electromagnetic radiation is ultraviolet radiation.

BRIEF DESCRIPTION OF THE DRAWINGS

The invention will be better understood and further advantages will become apparent on reading the detailed description of embodiments given by way of example in the following figures.

FIG. 2 shows an example of a microencapsulated component that can be employed in a device and method for fitting inserts according to the invention, FIG. 3 illustrates an example of a device and method for fitting inserts according to the invention.

For the sake of clarity, the same elements will bear the same reference signs in the various figures.

DETAILED DESCRIPTION

Figure 1A:
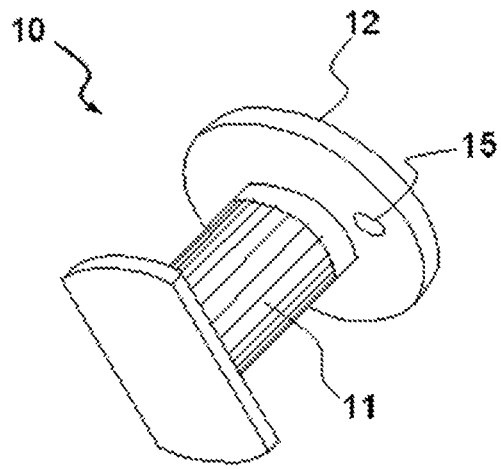
FIGS. 1a and 1b, already presented, show an insert fixed by bonding to a structure according to the known prior art.

FIG. 2 shows an example of a microencapsulated component. In the figure, a microcapsule 60 or microsphere has been opened out into two hemispheres, making it possible to see the internal structure of the microcapsule. The microcapsule 60 can comprise one or more cells 63 and 64 that encapsulate a component. The present invention envisages the employment of microencapsulated two-component adhesive. Thus, the adhesive consists both of microcapsules of polymerizable resin and of microcapsules of hardener. The microencapsulated adhesive is thus in the form of a powder formed by the mixture of microcapsules of resin and of hardener.

The pulverulent and non-polymerized form of the microencapsulated adhesive is particularly advantageous since it allows easy handling, without constraints of viscosity or of useful life. In the scope of the present invention, the adhesive can thus be deposited easily in contact with an insert to be fitted, and be distributed homogeneously without creating air bubbles.

Next, the polymerization of the adhesive can be initiated by rupturing the microcapsules, making it possible to bring the resin and the hardener into contact. A number of methods are envisaged by the present invention for rupturing the microcapsules of resin and hardener. It can be carried out by raising the temperature of the microencapsulated adhesive, resulting in the microcapsules opening and the resin and the hardener coming into contact. It can also be carried out by exposure to electromagnetic radiation, for example ultraviolet or infrared light radiation. The invention can be employed for various families of resin and hardener. An epoxy resin and a hardener from the family of the amines or phenols are particularly envisaged.

FIG. 3 illustrates an example of a device and a method for fitting inserts according to the invention. The device according to the invention relates to a fitting vehicle 40 intended to fit an insert in an orifice 24 formed in a structure 20. FIG. 3 comprises five diagrams, referenced (a), (b), (c), (d) and (e), showing the fitting vehicle for five consecutive stages in the fitting of the insert.

Figure 1B:
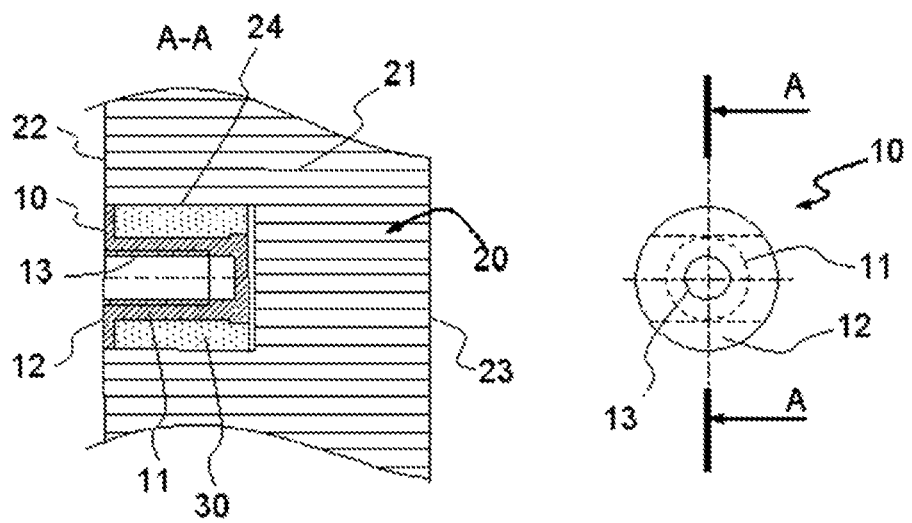

The fitting vehicle 40 comprises an insert to be fitted, a polymerizable adhesive and an applicator. The insert to be fitted can be in any form. In the example shown in FIG. 3, it has a form similar to the insert previously described in FIGS. 1a and 1b. In the following text, it has the same reference sign 10 and comprises a cylindrical body 11 and a flange 12. Similarly, the adhesive can consist of various materials and be in various forms. In a preferred embodiment of the invention, a microencapsulated adhesive 30 as described above by FIG. 2 is employed.

The aim of the applicator according to the invention is to receive the insert to be fitted and the adhesive, to allow the polymerization of the adhesive to be initiated, and then to fit the insert in the structure. Here too, a number of embodiments are envisaged by the present invention for the applicator. FIG. 3 shows a possible example of an applicator that functions in the manner of a syringe; the insert and the adhesive being first of all held in the body of the syringe, and then deposited in the structure. This example of an applicator will now be described in detail. It will be understood that the present invention is not limited to this particular form of the applicator.

The applicator 41 comprises a piston 42 and a sheath 43 in which the piston 42 can slide along a longitudinal axis X. The piston 42 can slide in the sheath 43 between two end positions:
  a first position, known as the armed position, in which the piston 42 is partially inserted into the sheath 43; the internal volume delimited by the sheath 43 and the piston thus positioned defining an open enclosure 50 in which the insert and the adhesive can be held, and
  a second position, known as the triggered position, in which the piston 42 is inserted into the sheath 43 so as to push back the insert and the adhesive out of the open enclosure 50.

Diagram (a) shows the fitting vehicle in a first stage of the method for fitting the insert. The applicator is in the armed position. In the example shown, the flange 12 of the insert 10 is positioned against the head 44 of the piston 42. More specifically, that side of the flange 12 that faces away from the body 11 of the insert 10 is in contact with the head 44 of the piston 42. In this example, the internal volume of the sheath is substantially cylindrical and has a diameter equal, allowing for play, to the outside diameter of the piston, which likewise has a substantially cylindrical shape. In addition, the applicator is configured such that this diameter is approximately equal to the diameter of the flange 12 of the insert. Configured in this way, the insert 10 is in contact with the sheath 43, along the circular periphery of the flange 12.

In one possible implementation of the invention, the fitting vehicle comprises connecting means between the piston 42 and the insert 10. It is for example envisaged to employ a threaded rod fixed to the head 44 of the piston 42 which engages with a thread formed in the insert 10. Advantageously, this thread is the thread 12 of the insert already described in FIGS. 1a and 1b and intended for subsequently fixing equipment to the insert. Fixing the insert to the head of the piston allows safe handling of the fitting vehicle.

In this armed position of the applicator, the adhesive 30 can be deposited in the open enclosure 50. The insert 10 is at least partially immersed in the adhesive 30. In the case of a microencapsulated adhesive, the non-polymerized adhesive can be easily deposited in the open enclosure 50, for example by gravity or injection. On account of its low viscosity, the adhesive surrounds the insert without including air bubbles.

Diagram (b) shows the fitting vehicle in a second stage of the method of fitting the insert. In order to initiate the polymerization of the adhesive 30, the fitting vehicle 40 can be temporarily exposed to electromagnetic radiation 46, symbolized by the lightning bolt in the diagram, and/or to an increased temperature 47, symbolized by the thermometer in the diagram. At the end of this step of initiation of the polymerization, the adhesive has a higher viscosity which is sufficiently high to allow the fitting vehicle to be handled without there being a risk of adhesive being ejected from the open enclosure 50.

As shown in diagram (c), the fitting vehicle can be turned round so as to allow the insert to be fitted on the upper side of a horizontally positioned panel 20. The fitting of the insert on a vertically positioned panel is also envisaged.

Diagram (c) shows the fitting vehicle 40 positioned against the external surface 22 of the panel 20 through which a substantially cylindrical orifice 24 is formed. The diameter of the orifice 24 is substantially equal to the diameter of the flange 12 and to the outside diameter of the piston 42. The fitting vehicle 40 is positioned adjacent to the orifice. In other words, the fitting vehicle is positioned so as to align the longitudinal sliding axis X of the piston with the main axis of the substantially cylindrical orifice 24. The circular end 51 of the sheath 43 is in contact with the external surface 22 of the panel 20. The open enclosure 50 of the fitting vehicle 40 is positioned adjacent to the orifice 24 in the panel 20.

Diagram (d) shows the fitting vehicle in an intermediate position between the armed position and the triggered position. The piston 42 passes partially into the sheath 43, pushing back the insert 10 and the adhesive 30 in the orifice 24. On account of the honeycomb structure of the panel 20, the orifice 24 does not have a strictly cylindrical shape; honeycomb cells that are partially open communicating with the cylindrical opening obtained generally by machining of the panel. The movement of the piston 42 pushes back the adhesive 30 in the orifice 24 and in these cells that communicate with the orifice. As shown in diagrams (d) and (e), a part of the adhesive 30 is thus deposited in the panel beyond the volume delimited by the outside diameter of the piston 42.

Diagram (e) shows the fitting vehicle in the triggered position. The insert 10 and the adhesive 30 have been pushed back entirely out of the open enclosure 50 by the piston 42. By virtue of the open cells that communicate with the orifice, the adhesive 30 is deposited in the panel so as to surround the insert, contributing to robust fixing of the insert in the panel. As shown in FIG. 3, the insert and the applicator can be configured to fit the insert such that it is flush with the external surface 22 of the panel 20. To this end, the piston 42 in the triggered position is flush with the end 51 of the sheath 43 in contact with the panel 20.

As shown in FIG. 3, the insert 10 can also comprise positioning means 70 that are intended to keep the insert 10 in position in the orifice 24. These positioning means 70 can for example comprise a spring mechanism mounted in compression between the insert 10 and the sheath 43 in the armed position. When the insert 10 is pushed back out of the sheath 43 by the piston 42 in the triggered position, the spring mechanism relaxes and bears against the underside of the external surface 22 of the panel 10. These positioning means 70 are not intended to ensure the mechanical integrity of the connection between the insert and the panel but to keep the insert in position while the adhesive dries, after the insert has been fitted.

In the above-described case where the fitting vehicle comprises connecting means between the insert and the head of the piston, the method comprises, after the adhesive has dried, a step of disconnecting the insert from the head of the piston.

A preferred exemplary embodiment of the fitting vehicle has been described by way of FIG. 3. In this example, the applicator 41 has a cylindrical overall shape in the manner of a syringe. It is suitable for fitting an insert 10 having a cylindrical flange in an orifice which also has a cylindrical overall shape. Furthermore, in this example, the opening of the enclosure consists of one end of the sheath of the applicator. However, this particular embodiment does not limit the present invention. The invention relates more generally to a fitting vehicle in which the applicator comprises an open enclosure in which the insert and the adhesive can be held; and deployment means that are able to push back the insert and the adhesive out of the open enclosure so as to allow the insert to be fitted in the orifice in the structure.

This fitting vehicle is particularly advantageous since it makes it possible to control the application and the polymerization of the adhesive. The adhesive can be deposited in the fitting vehicle in a non-polymerized state. The polymerization of the adhesive is then initiated by an external intervention (raising of the temperature, exposure to electromagnetic radiation) allowing the two components to be brought into contact. It becomes possible to store the fitting vehicle for a long period of time.

Figure 4:
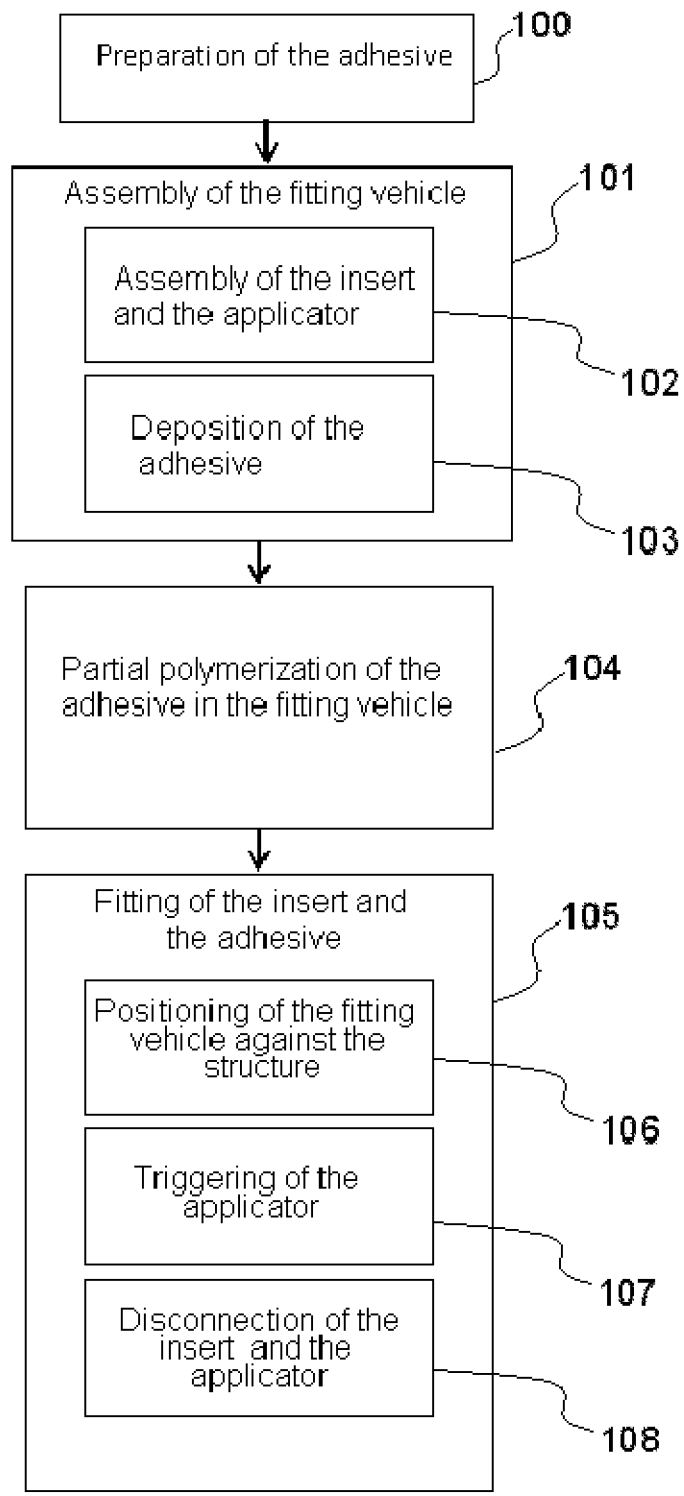
FIG. 4 illustrates steps in a method for fitting inserts according to the invention.

FIG. 4 illustrates the steps in the method for fitting inserts. The method according to the invention comprises three main steps:
- a first step 101 which consists in assembling a fitting vehicle 40 comprising an insert 10, an applicator 41 and an adhesive 30,
- a second step 104 which consists in partially polymerizing the adhesive 30 in the fitting vehicle 40, and a third step 105 which consists in fitting the insert 10 and the adhesive 30 in the orifice 24 in the structure 20 by triggering the applicator 41 of the fitting vehicle 40 applied to the structure 20.

The method can also comprise further steps. In particular, the method can comprise a preliminary step 100 of preparing the adhesive 30. In the case where the adhesive is microencapsulated, this preparation step consists in microencapsulating the adhesive 30 in the form of microcapsules 60 of resin and hardener.

Step 101 of assembling the fitting vehicle can comprise two substeps:

- a first substep 102 which consists in fixing the insert 10 in the open enclosure 50 of the applicator 41, and
- a second substep 103 which consists in depositing the adhesive 30, by gravity or by injection, in the open enclosure 50, at least partially covering the insert 10.

In the example described in FIG. 4, the first substep 102 comprises the positioning of the piston 42 in the sheath 43, in the armed position, followed by the positioning of the insert 10 against and possibly the fixing thereof to the head 44 of the piston 42. The second substep 103 comprises the deposition of the adhesive 30 in the open enclosure 50 formed by the sheath 43 and the piston 42 in the armed position. As described above, the adhesive can be deposited in the form of a powder in the case of a microencapsulated adhesive.

Step 104 of partial polymerization can be carried out in an oven in which a number of fitting vehicles are placed. The acceleration can be carried out by raising the temperature within the oven. It can also be carried out by means of electromagnetic radiation, for example ultraviolet radiation, allowing the microcapsules of the adhesive to be broken. The electromagnetic radiation can be directed toward the adhesive through the opening in the enclosure 50 of the fitting vehicles. It can also be directed toward the adhesive by passing through components of the vehicle. For example, the sheath 43 and/or the piston 42 can be produced from a material that is transparent to radiation in order to allow the polymerization of the adhesive.

Step 105 of fitting the insert and the adhesive can comprise a number of substeps, in particular:

- a first substep 106 which consists in positioning the fitting vehicle against the panel. Various means are envisaged for positioning the insert 10 adjacent to the orifice 24 in the structure. In an automated method, it is envisaged to employ a positioning robot that carries one or more fitting vehicles and one or more vision systems.
- a second substep 107 which consists in triggering the applicator 41 by sliding the piston from the armed position to the triggered position. During this substep, the insert 10 and the adhesive 30 are pushed back from the open enclosure 50 to the orifice 24 in the structure. Advantageously, this step can also be automated.
- a third substep 108 which consists in disconnecting the insert 10 from the piston 42 of the fitting vehicle 40. When the fixing means 60 are a threaded rod on the head of the piston and a thread in the insert, this substep consists in unscrewing the threaded rod from the thread.

Further subsequent steps, which can be automated like the preceding steps, are also envisaged. In particular, a step of testing the mechanical strength of the insert fitted in the structure can be carried out after the adhesive has dried. A step of recycling the fitting vehicles is also envisaged. Following the step 105 of fitting the insert, the applicator 41 can be recovered and then reused, by positioning the piston in the armed position, positioning and optionally fixing the insert and then depositing the adhesive in the open enclosure.

The invention claimed is:

1. A method for fitting an insert by bonding in an orifice formed in a structure, comprising:
    assembling a fitting vehicle comprising an insert to be fitted, an applicator and a polymerizable adhesive, the applicator being configured to place the insert and polymerizable adhesive completely with the orifice and flush with an outer surface of the structure;
    initiating the polymerization of the adhesive in the fitting vehicle; and
    fitting the insert and the adhesive in the orifice in the structure by triggering the applicator of the fitting vehicle applied to the structure, wherein the polymerization of the adhesive in the fitting vehicle is initiated prior to the fitting of the insert and the adhesive in the orifice of the structure.

2. The method according to claim 1, wherein the adhesive is a two-component adhesive comprising a resin and a hardener, the bringing of which into contact with the resin initiates the polymerization of the adhesive.

3. The method according to claim 2, wherein the polymerization of the adhesive in the fitting vehicle is initiated by the fitting vehicle being exposed to electromagnetic radiation.

4. The method according to claim 3, wherein the electromagnetic radiation is ultraviolet radiation.

5. The method according to claim 2, comprising a preliminary step of microencapsulating the adhesive, in the form of microcapsules of resin and hardener; the polymerization of the adhesive being initiated by rupturing of the microcapsules, allowing the resin and the hardener to be brought into contact.

6. The method according to claim 2, wherein the polymerization of the adhesive is initiated by the temperature of the fitting vehicle being raised.

7. The method according to claim 1, wherein the assembling the fitting vehicle comprises a first substep of fixing the insert in an open enclosure of the applicator, and a second substep of depositing the adhesive in the open enclosure, at least partially covering the insert.

8. The method according to claim 1, comprising one or more automated steps.

* * * * *